June 16, 1931. C. E. PLOEGER 1,810,498
VALVE
Filed March 5, 1929

INVENTOR
Clyde Edward Ploeger
BY
his ATTORNEY

Patented June 16, 1931

1,810,498

UNITED STATES PATENT OFFICE

CLYDE EDWARD PLOEGER, OF EVANSVILLE, INDIANA, ASSIGNOR TO SERVEL, INC., OF NEW YORK, N. Y., A CORPORATION OF DELAWARE

VALVE

Application filed March 5, 1929. Serial No. 344,116.

My invention relates to valves.

I have developed a valve which is quiet in operation, permits the passage of liquid or oil, is sturdy in construction, simple to manufacture, and does not require adjustment. This valve has been developed in connection with automatic refrigerators of the domestic type. Domestic refrigerators must be quiet. The majority of valves at present used are not sufficiently quiet. I have combined the features above set out into a structure hereinafter described, which, consequently, is of particular value for domestic refrigeration. However, the valve is obviously applicable to other uses.

The majority of valves at present used have a single closure member. This member usually clicks on seating. My novel valve, which has a plurality of overlapping movable closure members of spring-like characteristic, does not click on seating.

The nature of the invention and further advantages will be apparent from the following description taken in connection with the accompanying drawings, whereon:

Figure 1:
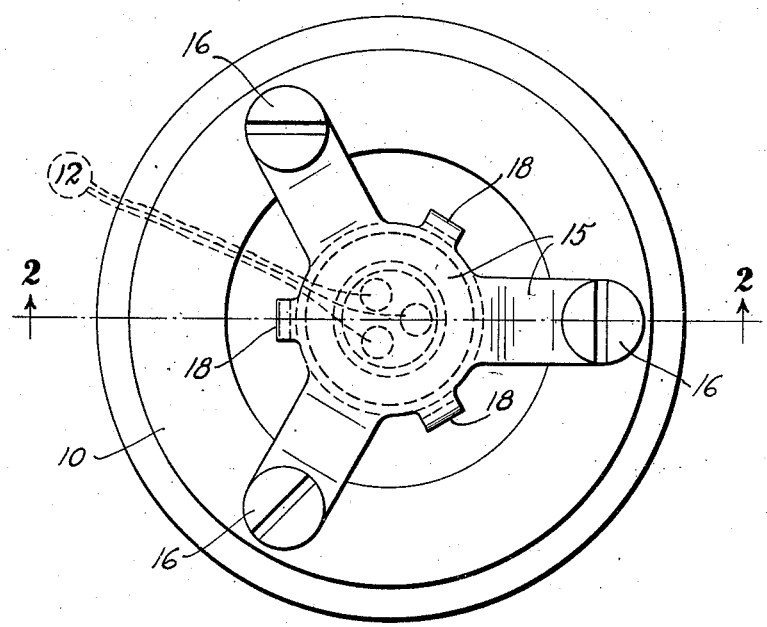
Fig. 1 shows a valve in accordance with the present invention.
Figure 2:
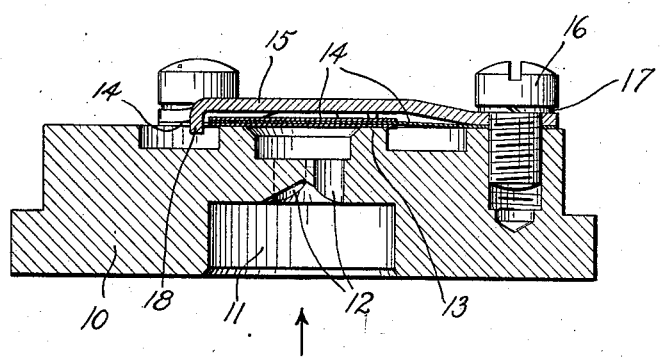
Fig. 2 is a cross-sectional view on the line 2—2 of Fig. 1.

Reference character 10 designates a circular port member. As the valve is applied to a refrigerating compressor this member is a fixed plate at the upper end of the compressor cylinder. In the center of the port member is a port 11 comprising two chambers on each side of the port member and three passages 12 connecting the two chambers. The flow of fluid through the valve is indicated by an arrow. A projecting annular boss 13 has the valve seat thereon. The valve seat is flat.

The valve closure comprises three radially extending flexible, spring-like, flat plates 14, fixed to the port member near the edge and free to move over the valve seat.

Plates 14 are held in place by a relatively heavy top plate or guard member 15 and screws 16. Top plate 15 has a central circular portion and three radially extending arms, 120° apart, covering the plates 14. Screws 16 pass through holes in the arms of top plate 15 and through individual holes in plates 14. Top plate 15 serves to limit movement of plates 14. Washers 17 may be used under the bolt heads.

Between the arms of the top plate are downwardly extending lugs 18 which have a position outside the circular portions of plates 14 and limit sidewise movement of these plates about the pivots formed by screws 16.

It will be noted that holes 12 are radially in line with the arms of the top plate and with the extending portions of the plates 14.

While I have described the preferred form of valve, it will be understood that variations are possible within the spirit and scope of the invention.

Having thus described my invention, what I claim is:

1. A valve comprising a port member having a port therein and a valve closure for covering said port comprising a plurality of flexible flat plates having securing portions secured to different parts of said port member and converging from the respective securing points toward the port and toward each other and having overlapping portions adjacent said port.

2. A valve comprising a circular port member having a port therein centrally disposed and a valve closure for covering said port comprising a plurality of radially extending flat flexible plates and means for individually securing said plates to the port member at different points adjacent the edge of the port member and said plates converging from the respective securing points and having overlapping portions adjacent said port.

3. A valve comprising a circular port member having a port therein centrally disposed and a valve closure for covering said port comprising a plurality of flat flexible plates extending radially, 120° apart, and secured to the port member.

4. A valve comprising a circular port member having a port therein centrally disposed and a valve closure for covering said port comprising a plurality of flat flexible plates extending radially, 120° apart, and means for securing said plates and limiting movement thereof.

5. A valve comprising a port member having a port therein, a valve closure for covering said port comprising a plurality of flexible members having overlapping portions adjacent the port, means to individually secure the plates at different points away from said port, said plates converging toward said port and means to limit movement of the flexible members away from the port and sidewise with respect to the port.

6. A valve comprising a port member having a port therein, a valve closure for covering the port comprising a plurality of flexible members extending toward each other and having overlapping portions adjacent said port and being outwardly secured, a guard member over the plates having extending arms, bolts passing through the arms and the plates and lugs on the guard members for limiting sidewise movement of the flexible members.

7. A valve comprising a port member having a port therein, a valve closure for covering said port comprising a plurality of radially extending flat flexible plates, a guard member over said plates secured to the port member with the plates between the port member and arms on the guard member, lugs on the guard member for limiting sidewise movement of the plates and said port comprising a plurality of holes, one radially in line with each arm of the guard member.

8. A valve comprising a port member having a port therein, a valve closure for covering said port comprising a plurality of radially extending flat flexible plates having overlapping portions adjacent said port and being individually secured away from said port, a guard member over said plates and said port comprising a plurality of holes, one radially in line with each of said plates.

9. A valve comprising a port member having a port therein, a valve closure for covering said port comprising a plurality of radially extending flat flexible plates having overlapping portions adjacent said port and being individually secured away from said port, a guard member comprising a plurality of radially extending arms, one arm being above each of said plates and said port comprising a plurality of holes, one radially in line with each of said plates.

10. A valve comprising a circular port member having a port therein centrally disposed and a valve closure for covering said port comprising a plurality of flat flexible plates extending radially 120° apart, having overlapping portions adjacent said port, and secured to the port member away from said port.

11. A valve comprising a circular port member having a port therein centrally disposed and a valve closure for covering said port comprising a plurality of flat flexible overlapping plates extending radially, and radially spaced at equal angles and secured to the port member away from the said port.

12. A valve comprising a circular port member having a port therein centrally disposed and a valve closure for covering said port comprising a plurality of flat flexible overlapping plates extending radially, and radially spaced at equal angles, and means for securing said plates away from said port and for limiting movement thereof.

In testimony whereof I have affixed my signature.

CLYDE EDWARD PLOEGER.